US011256934B2

(12) United States Patent
Han

(10) Patent No.: US 11,256,934 B2
(45) Date of Patent: Feb. 22, 2022

(54) VEHICLE AND METHOD FOR CONTROLLING SAME

(71) Applicant: SAMSUNG ELECTRONICS CO., LTD., Suwon-si (KR)

(72) Inventor: Seongwon Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 105 days.

(21) Appl. No.: 16/650,498

(22) PCT Filed: Dec. 4, 2018

(86) PCT No.: PCT/KR2018/015276
§ 371 (c)(1),
(2) Date: Mar. 25, 2020

(87) PCT Pub. No.: WO2019/112309
PCT Pub. Date: Jun. 13, 2019

(65) Prior Publication Data
US 2020/0226393 A1 Jul. 16, 2020

(30) Foreign Application Priority Data
Dec. 7, 2017 (KR) .................. 10-2017-0167240

(51) Int. Cl.
G06K 9/00 (2006.01)
G06K 9/62 (2006.01)
(Continued)

(52) U.S. Cl.
CPC ..... *G06K 9/00818* (2013.01); *B60W 60/0011* (2020.02); *B60W 60/0025* (2020.02);
(Continued)

(58) Field of Classification Search
None
See application file for complete search history.

(56) References Cited

U.S. PATENT DOCUMENTS 6,801,638 B1 * 10/2004 Janssen .................. B60K 35/00
382/104
7,058,206 B1 * 6/2006 Janssen .................. B60K 35/00
382/104
(Continued)

FOREIGN PATENT DOCUMENTS

CN 106683065 A 5/2017
CN 107122385 B * 12/2020 ............. F21S 41/60
(Continued)

OTHER PUBLICATIONS

Communication dated Oct. 21, 2020, issued by the European Patent Office in counterpart European Application No. 18887087.7.
(Continued)

*Primary Examiner* — Mohammed Rachedine
(74) *Attorney, Agent, or Firm* — Sughrue Mion, PLLC

(57) ABSTRACT

Disclosed is a vehicle. The vehicle comprises: storage in which a plurality of reference images and position information corresponding to respective plurality of reference images are stored; and a processor which acquires through a camera an image of the surrounding environment in which the vehicle is traveling, acquires a reference image corresponding to the current position of the vehicle among the plurality of reference images if the visibility of the surrounding environment image satisfies a predetermined condition, acquires an image in which the surrounding environment image and the reference image are merged, and controls the operation of the vehicle on the basis of the merged image.

15 Claims, 8 Drawing Sheets

(51) Int. Cl.
  *G02B 27/01* (2006.01)
  *B60W 60/00* (2020.01)
(52) U.S. Cl.
  CPC ......... *G02B 27/0101* (2013.01); *G06K 9/627*
    (2013.01); *G06K 9/6219* (2013.01)

(56) References Cited

U.S. PATENT DOCUMENTS

| | | | |
|---|---|---|---|
| 8,405,724 B2 | 3/2013 | Jeon et al. | |
| 9,145,139 B2 | 9/2015 | Ferguson et al. | |
| 9,221,461 B2 | 12/2015 | Ferguson et al. | |
| 9,387,854 B1 | 7/2016 | Ferguson et al. | |
| 10,019,652 B2 | 7/2018 | Wang et al. | |
| 10,240,934 B2 | 3/2019 | Miksa et al. | |
| 2007/0061076 A1* | 3/2007 | Shulman | G01C 11/02 701/500 |
| 2014/0067187 A1* | 3/2014 | Ferguson | B60W 30/12 701/28 |
| 2014/0379247 A1 | 12/2014 | Ferguson et al. | |
| 2016/0214605 A1 | 7/2016 | Ferguson et al. | |
| 2016/0364197 A1 | 12/2016 | Cho et al. | |
| 2017/0343823 A1 | 11/2017 | Tagawa et al. | |
| 2021/0162921 A1* | 6/2021 | Leng | H04N 5/23229 |

FOREIGN PATENT DOCUMENTS

| | | | |
|---|---|---|---|
| EP | 3 130 891 A1 | 2/2017 | |
| JP | 2003-529043 A | 9/2003 | |
| JP | 2007199840 A | 8/2007 | |
| JP | 2007-279818 A | 10/2007 | |
| JP | 2009147628 A | 7/2009 | |
| JP | 2009-237986 A | 10/2009 | |
| JP | 2017-151148 A | 8/2017 | |
| JP | 2017-151973 A | 8/2017 | |
| KR | 10-2010-0129965 A | 12/2010 | |
| KR | 10-2015-0052272 A | 5/2015 | |
| KR | 1020160035099 A | 3/2016 | |
| KR | 10-2016-0147016 A | 12/2016 | |
| WO | 2016098591 A1 | 6/2016 | |
| WO | 2017025334 A1 | 2/2017 | |
| WO | WO-2017025341 A1 * | 2/2017 | .............. H04W 4/44 |
| WO | WO-2018006082 A2 * | 1/2018 | .......... G05D 1/0274 |

OTHER PUBLICATIONS

Communication dated May 11, 2021, issued by the Korean Intellectual Property Office in Korean Application No. 10-2017-0167240.
Kevin Eykholt et al. "Robust Physical-World Attacks on Deep Learning Visual Classification" CVPR, 2018, [retrieved from arXiv:1707.08945v5 [cs.CR] (11 pages total).
Written Opinion (PCT/ISA/237) issued by the International Searching Authority in corresponding International Application No. PCT/KR2018/015276, dated Mar. 4, 2019.
International Search Report (PCT/ISA/210), issued by International Searching Authority in corresponding International Application No. PCT/KR2018/015276, dated Mar. 4, 2019.
Communication dated Sep. 1, 2021 issued by the Korean Intellectual Property Office in application English No. 10-2017-0167240.

* cited by examiner (a)

(b)

(c)

VEHICLE AND METHOD FOR CONTROLLING SAME

TECHNICAL FIELD

The disclosure relates to a vehicle and a method for controlling the same, and more particularly relates to a vehicle providing a self-driving mode and a method for controlling the same.

BACKGROUND ART

Recently, according to the growing interest in self-driving vehicles, the related technologies are actively researched and developed.

In particular, although a self-driving vehicle identifies a traveling route based on information regarding a surrounding environment of the vehicle, there were problems that the vehicle was not able to accurately identify a traveling route or malfunctions frequently occurred due to failure of accurate recognition of the surrounding environment of the vehicle.

For example, although it is a route through which the vehicle traveled safe in the past, there was a problem that the self-driving function is disabled due to failure of recognition of the traveling route according to weather factors such as snow, rain, fog, and the like and a time factor such as night.

Therefore, it was necessary to develop a method for acquiring surrounding environment information of the vehicle independently from the weather factor or the time factor and identifying the traveling route.

DISCLOSURE

Technical Problem

The disclosure has been made to address the aforementioned needs, and provides a vehicle capable of providing an image having improved visibility of a road sign and the like and performing self-driving based on this, and a method for controlling the same.

Technical Solution

According to an embodiment of the disclosure for achieving the above-mentioned object, there is provided a vehicle comprising a camera, a storage storing a plurality of reference images and location information corresponding to each of the plurality of reference images, and a processor configured to acquire an image of a surrounding environment in which the vehicle is currently traveling through a camera, based on visibility of the image of the surrounding environment satisfying a predetermined condition, acquire a reference image corresponding to a current location of the vehicle among the plurality of reference images, acquire an image in which the image of the surrounding environment and the reference image are merged, and control driving of the vehicle based on the merged image.

The processor may be configured to identify traffic sign information included in the reference image, and generate a merged image by replacing a corresponding region in the image of the surrounding environment with the identified traffic sign information.

The traffic sign information may include at least one of a road sign, a lane, a speed bump, traffic lights, and road markings with words.

The storage may store a representative image indicating the traffic sign information, and the processor may be configured to acquire a representative image corresponding to at least one piece of traffic sign information included in the merged image, and replace the at least one piece of traffic sign information with the acquired representative image.

The vehicle may further include a communicator, and the processor is configured to acquire traffic sign information corresponding to the current location from an external server through the communicator, and add the traffic sign information acquired from the external server to the merged image.

The vehicle may further include a head up display (HUD), and the processor may be configured to provide at least one of the merged image and the identified traffic sign information through the HUD.

The vehicle may further include a head up display (HUD), and the processor may be configured to acquire a rendered image by performing rendering of the merged image, store the rendered image in the storage, and provide the rendered image through the HUD, and the rendered image may be an image generated by identifying a dynamic object and the traffic sign information in the merged image. The processor may be configured to, based on visibility of the image of the surrounding environment being higher than visibility of the reference image corresponding to current location information, update the reference image with the image of the surrounding environment.

The processor may be configured to compare visibility of the image of the surrounding environment and visibility of the reference image, after a predetermined period of time elapsed from a point when the reference image is generated, and based on visibility of the image of the surrounding environment being higher than visibility of the reference image, updating the reference image with the image of the surrounding environment.

The vehicle may further include a head up display (HUD), and the processor may be configured to, based on the vehicle being in a self-driving mode, executing self-driving based on the merged image, and based on the vehicle being in a manual driving mode, providing at least one of the merged image and the identified traffic sign information through the HUD.

According to another embodiment of the disclosure, there is provided a method for controlling a vehicle in which a plurality of reference images and location information corresponding to each of the plurality of reference images are stored, the method including: acquiring an image of a surrounding environment in which the vehicle is currently traveling, based on visibility of the image of the surrounding environment satisfying a predetermined condition, acquiring a reference image corresponding to a current location of the vehicle among the plurality of reference images, acquiring an image in which the image of the surrounding environment and the reference image are merged, and controlling driving of the vehicle based on the merged image.

The acquiring a merged image may include identifying traffic sign information included in the reference image, and generating a merged image by replacing a corresponding region in the image of the surrounding environment with the identified traffic sign information.

The traffic sign information may include at least one of a road sign, a lane, a speed bump, traffic lights, and road markings with words.

The vehicle may store a representative image indicating the traffic sign information, and the acquiring a merged image may include acquiring a representative image corresponding to at least one piece of traffic sign information included in the merged image, and replacing the at least one piece of traffic sign information with the acquired representative image.

The method may further include acquiring traffic sign information corresponding to the current location from an external server, and adding the traffic sign information acquired from the external server to the merged image.

The vehicle may include a head up display (HUD), and the method may further include providing at least one of the merged image and the identified traffic sign information through the HUD.

The method may further include, based on visibility of the image of the surrounding environment being higher than visibility of the reference image corresponding to current location information, updating the reference image with the image of the surrounding environment.

The method may further include comparing visibility of the image of the surrounding environment and visibility of the reference image, after a predetermined period of time elapsed from a point when the reference image is generated, and based on visibility of the image of the surrounding environment being higher than visibility of the reference image, updating the reference image with the image of the surrounding environment.

The controlling driving of the vehicle may include, based on the vehicle being in a self-driving mode, executing self-driving based on the merged image, and based on the vehicle being in a manual driving mode, providing at least one of the merged image and the identified traffic sign information through the HUD.

According to still another embodiment of the disclosure, there is provided a non-transitory computer-readable medium storing computer instructions to, based on computer instructions being executed by a processor of a vehicle, enable the vehicle to execute operations, in which the operations may include acquiring an image of a surrounding environment in which the vehicle is currently traveling, based on visibility of the image of the surrounding environment satisfying a predetermined condition, acquiring a reference image corresponding to a current location of the vehicle among the plurality of reference images, acquiring an image in which the image of the surrounding environment and the reference image are merged, and controlling driving of the vehicle based on the merged image.

Effect of Invention

According to the embodiments of the disclosure described above, the image having improved visibility of the traffic sign information may be acquired and a failure rate may be reduced during the self-driving.

BEST MODE

Detailed Description of Exemplary Embodiments

Figure 1:
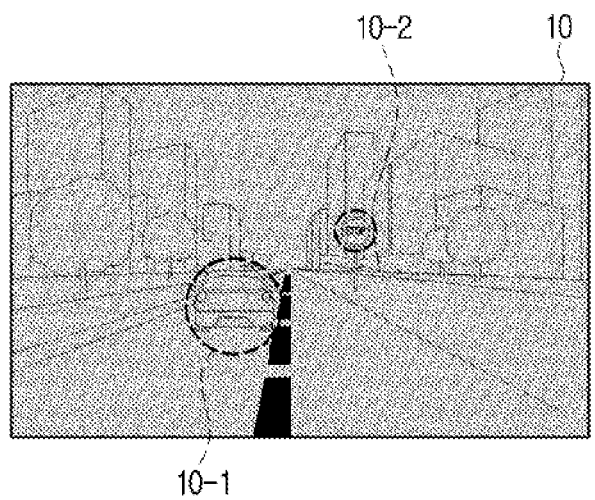
FIG. 1 is a view for describing an image of a surrounding environment and a reference image for convenience of understanding.
Figure 1:
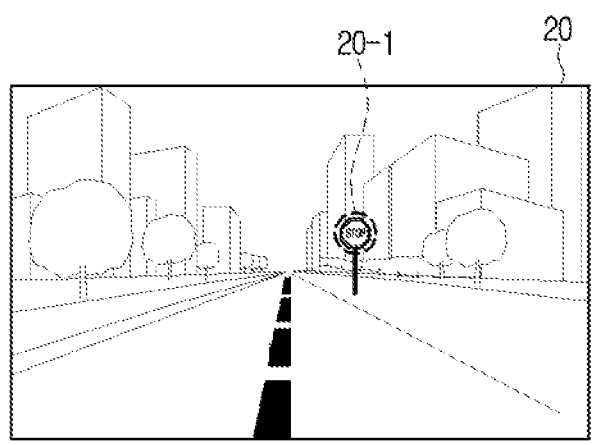

The disclosure will be described in detail after briefly explaining the terms used in the specification.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there is also a term arbitrarily selected by the applicant, in which case the meaning will be described in detail in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art is omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not shown).

Hereinafter, with reference to the accompanying drawings, embodiments of the disclosure will be described in detail so that those skilled in the art can easily make and use the embodiments in the technical field to which to which the disclosure belongs. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

FIG. 1 is a view for describing an image of a surrounding environment and a reference image for convenience of understanding of the disclosure.

Referring to FIG. 1, a vehicle according to an embodiment of the disclosure may monitor a surrounding environment by using a sensor prepared in the vehicle. In an example, the vehicle may acquire an image 10 of a surrounding environment by capturing a route through which the vehicle is traveling, a surrounding environment, conditions of the road ahead by using a camera prepared in the vehicle. The camera herein is a component for capturing an event occurring on a traveling route of the vehicle, the surrounding environment of the vehicle, and the like and may be referred to as a sensor, a camera, or an image sensor, but hereinafter, these are collectively referred to as a camera for convenience of description.

The vehicle according to an embodiment of the disclosure may acquire the image 10 of the surrounding environment in which the vehicle is currently traveling by using the camera, and identify whether or not visibility of the image 10 of the surrounding environment satisfies a predetermined condition. The visibility herein may mean discrimination regarding the traffic sign information included in the image 10 of the surrounding environment. In an example, if the image 10 of the surrounding environment includes a road sign 10-2, the visibility may mean a degree that the road sign 10-2 is identifiable. The visibility according to an embodiment of the disclosure may mean to include discrimination, legibility, observability, and the like regarding the traffic sign information. The traffic sign information will be described in detail with reference to FIG. 3.

The visibility of the image 10 of the surrounding environment according to the disclosure satisfying the predetermined condition may mean low visibility of objects included in the image 10 of the surrounding environment for a vehicle driver. For example, a case where the road sign 10-2 included in the image 10 of the surrounding environment may not be identified due to the weather factors such as snow, rain, fog, smog and the like and a time factor such as night and the meaning of the road sign 10-2, a word, a shape, a form, and the like of the road sign 10-2, and the like may not be recognized, may correspond to a case where the predetermined condition are satisfied.

Referring to FIG. 1, it may be confirmed that the visibility of the traffic sign information included in the image 10 of the surrounding environment deteriorates and, particularly, the road sign 10-2 may not be identified. In this case, the vehicle may acquire an image in which the image 10 of the surrounding environment and a reference image 20 are merged, and control the driving of the vehicle based on the merged image. In an example, the vehicle may identify the road sign 20-1 from the reference image 20 and acquire the merged image by using the identified road sign 20-1 and the image 10 of the surrounding environment.

The reference image 20 may mean an image having high visibility stored in the vehicle in advance. In an example, when the vehicle may identify the traffic sign information included in the image 10 of the surrounding environment captured while the vehicle travels through a route A according to the weather factor and the time factor, the vehicle may store the image 10 of the surrounding environment as the reference image 20. In this case, the vehicle may store location information of the route A together with the reference image 20. However, there is no limitation thereto, and the reference image 20 which is an image having high visibility of the traffic sign information included in the route is not limited to an image captured through the camera prepared in the vehicle, and may be images acquired by various methods such as an image received from an external server, an image captured through another vehicle, and the like.

Hereinabove, the operation of acquiring the merged image by using the image 10 of the surrounding environment and the reference image 20 by the vehicle has been briefly described. Hereinafter, a method for controlling the driving of the vehicle by acquiring the merged image by the vehicle will be described in detail.

Figure 2:
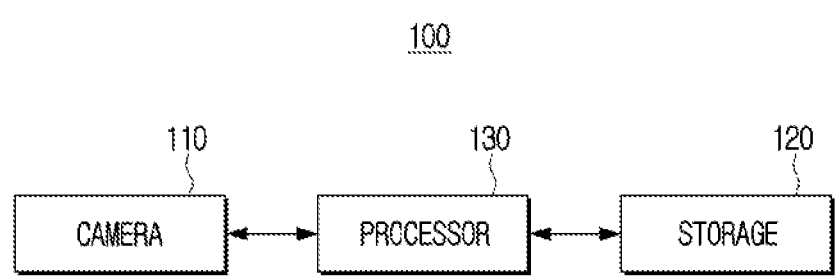
FIG. 2 is a block diagram showing a configuration of a vehicle according to an embodiment.

FIG. 2 is a block diagram showing a configuration of the vehicle according to an embodiment of the disclosure.

Referring to FIG. 2, a vehicle 100 includes a camera 110, a storage 120, and a processor 130.

The camera 110 may be disposed at a plurality of positions inside or outside of the vehicle 100. In this case, the vehicle 100 may capture the inside or outside of the vehicle 100 by using a plurality of cameras.

In particular, the camera 110 according to an embodiment of the disclosure may acquire the image 10 of the surrounding environment in which the vehicle 100 is currently traveling. In an example, the vehicle may acquire the image 10 of the surrounding environment in which traffic sign information and other traveling vehicles that are located and positioned ahead on the route through which the vehicle 100 is traveling are captured. The traffic sign info information herein may include at least one of a road sign, a lane, a speed bump, traffic lights, and road markings with words.

The storage 120 stores an operating system (O/S) software module for driving the vehicle 100, a vehicle control module for a self-driving mode of the vehicle 100, various communication modules, an image analysis software module, and various pieces of data such as various contents.

The storage 120 may be implemented as an internal memory such as a ROM or a RAM included in the processor 130 or may be implemented as a memory separated from the processor 130. In this case, the storage 120 may be implemented as a memory embedded in the vehicle 100 or may be implemented as a memory detachable from the vehicle 100 depending on the purpose of data storage. For example, data for driving the vehicle 100 may be stored in the memory embedded in the vehicle 100 and data for extension function of the vehicle 100 may be stored in the memory detachable from the vehicle 100. The memory embedded in the vehicle 100 may be implemented in a form of a non-volatile memory, a volatile memory, a hard disk drive (HDD), or a solid-state drive (SDD), and the memory detachable from the vehicle 100 may be implemented as a memory card (for example, a micro SD card or a USB memory) or an external memory (for example, a USB memory) connectable to a USB port.

Particularly, the storage 120 may store the plurality of reference images 20 and location information corresponding to each of the plurality of reference images 20. In an example, if the visibility of the image 10 of the surrounding environment acquired through the camera 110 during the traveling of the vehicle 100 is a degree that the traffic sign information included in the image 10 of the surrounding environment is identifiable, the acquired image 10 of the surrounding environment may be stored as the reference image 20. In this case, the vehicle may also store location information corresponding to the image 10 of the surrounding environment.

The plurality of reference images 20 according to an embodiment of the disclosure may mean images stored in the storage 120 as images having high visibility among the images 10 of the surrounding environment acquired through the camera 110 prepared in the vehicle. The image having high visibility herein may mean an image in which the processor 130 may identify the traffic sign information included in the image 10 of the surrounding environment by analyzing the image 10 of the surrounding environment. Hereinafter, for convenience of description, an image in which the traffic sign information included in the image is identifiable by analyzing the image will be collectively referred to as the image having high visibility.

In an example, a first image of the surrounding environment acquired during the daytime in a fine day may have relatively higher visibility than that of a second image of surrounding environment acquired at night in a cloudy day, and thus, the first image of the surrounding environment may be stored in the storage as the reference image 20. However, there is no limitation thereto, and the plurality of reference images 20 stored in the storage 120 may be an image received from an external server, an image captured through another vehicle, and the like.

The storage 120 according to an embodiment of the disclosure may store a representative image indicating the traffic sign information. The traffic sign information may include at least one of a road sign, a lane, a speed bump, a crosswalk, traffic lights, and road markings with words. In an example, if the lane from the traffic sign information included in the reference image 20 is identifiable but an unnecessary object is captured with the lane, the lane may be replaced with a lane of the representative image stored in the storage in a merged image. This will be described in detail with reference to FIG. 6.

The processor 130 may generally control the operations of the vehicle 100.

According to an embodiment, the processor 130 may include one or more of a central processing unit (CPU)), a micro controller unit (MCU), a micro processing unit (MPU), a controller, an application processor (AP), or a communication processor (CP), and an ARM processor or may be defined as the corresponding term. In addition, the processor 130 may be implemented as a system on chip (SoC) or a large scale integration (LSI) in which a processing algorithm is embedded, or may be implemented as a field programmable gate array (FPGA).

In particular, the processor 130 may acquire the image 10 of the surrounding environment in which the vehicle is currently traveling through the camera 110, and determine whether or not the visibility of the image 10 of the surrounding environment satisfies the predetermined condition. In an example, the processor 130 may analyze the image 10 of the surrounding environment, and if it is not possible to identify the traffic sign information included in the image 10 of the surrounding environment, it may be determined that the visibility of the image 10 of the surrounding environment satisfies the predetermined condition. In this case, the processor 130 may acquire the reference image 20 corresponding to a current location of the vehicle 100 among the plurality of reference images stored in the storage 120.

The processor 130 may acquire an image in which the image 10 of the surrounding environment and the acquired reference image 20 are merged. In an example, the processor 130 may identify the traffic sign information in the acquired reference image 20 and generate the merged image by replacing a region in the image 10 of the surrounding environment corresponding to the identified traffic sign information with the identified traffic sign information. However, there is no limitation thereto, and the image 10 of the surrounding environment may include an object identified through various types of sensors prepared in the vehicle 100 other than the camera 110. In an example, the vehicle may include at least one of a RADAR unit, a LIDAR unit, and an image sensor, and the processor 130 may acquire the image 10 of the surrounding environment based on an object identified through the RADAR unit, the LIDAR unit, the image sensor, or the like. According to an embodiment, the RADAR unit, the LIDAR unit, or the image sensor may detect a dynamic object located in a surrounding portion (for example, a vehicle, a pedestrian, a bicycle, or a motorcycle) during the traveling of the vehicle, and the processor may identify the image 10 of the surrounding environment based on the image acquired through the camera 110 and the dynamic object detected through the sensor.

The processor 130 may control the driving of the vehicle 100 based on the merged image. In an example, the vehicle 100 may be implemented as a self-driving vehicle providing a self-driving mode and the vehicle 1000 may perform the self-driving of the vehicle 100 based on the merged image. The vehicle 100 in the related art performing the self-driving based on the mage 10 of the surrounding environment having low visibility had a problem that malfunctions frequently occurred due to failure of accurate recognition of road signs, lanes, and the like in the surrounding portion during the self-driving of the vehicle.

The processor 130 according to an embodiment of the disclosure may acquire an image in which the image 10 of the surrounding environment and the reference image 20 are merged and execute the self-driving based on the merged image by considering visibility during the execution of the self-driving, thereby significantly reducing a possibility of malfunctions.

If the visibility of the image 10 of the surrounding environment is higher than the visibility of the reference image 20 corresponding to current location information, the processor 130 according to an embodiment of the disclosure may update the reference image 20 with the image 10 of the surrounding environment and store the image in the storage 120. The processor 130 may compare the discrimination of the traffic sign information included in the image 10 of the surrounding environment and the discrimination of the traffic sign information included in the reference image with each other, and determine whether or not the visibility of the image 10 of the surrounding environment is higher than the visibility of the reference image 20 based on the compared result.

The processor 130 according to another embodiment of the disclosure may compare the visibility of the image 10 of the surrounding environment and the visibility of the reference image 20 with each other, when a predetermine period of time has elapsed from a point when the reference image 20 is generated. With the elapse of time, the traffic sign information such as a road sign, lanes, or a crosswalk on the road may be changed. The reference image 20 after the elapse of the predetermined period of time may not accurately reflect current traffic sign information with a high possibility, and accordingly, the processor 130 may determine whether or not the predetermined period of time has elapsed from a point when the reference image 20 is generated, and update the reference image 20, if the predetermined period of time has elapsed. In an example, if the vehicle is traveling a location A and the reference image 20 corresponding to the location A is an image after the elapse of the predetermined period of time from the generation point, the processor 130 may compare each visibility of the image 10 of the surrounding environment regarding the location A acquired through the camera 110 and the reference image 20. If the visibility of the image 10 of the surrounding environment is higher than the visibility of the reference image 20 according to the compared result, the image 10 of the surrounding environment may be stored in the storage 120 as the reference image 20. Accordingly, the updating of the reference image 20 corresponding to the location A may be executed.

The vehicle 100 according to an embodiment of the disclosure may further include a propulsion device, a power supply device, an input device, an output device, a traveling device, a sensing device, a communicator, a display, and the like.

The propulsion device may include an engine/motor, an energy source, a transmission, and a wheel/tire.

The engine/motor may be any combination of an internal combustion engine, an electric motor, a steam engine, and a stirling engine. In an example, if the vehicle 100 is a gas-electric hybrid car, the engine/motor may be implemented as a gasoline engine and an electric motor.

The energy source may be a source of energy providing power to the engine/motor. That is, the engine/motor may convert the energy source into mechanical energy and use it for the propulsion of the vehicle 100. The energy source may be at least one of gasoline, diesel, propane, other gas-based fuels, ethanol, a solar panel, a battery, and other electric power source, and may be at least one of a fuel tank, a battery, a capacitor, and a flywheel.

The transmission may transmit the mechanical power from the engine/motor to the wheel/tire. For example, the transmission may include at least one of a gearbox, a clutch, a differential, and a drive shaft. When the transmission includes drive shafts, the drive shafts may include one or more axles configured to be combined with the wheel/tire.

The vehicle 100 may include one or more wheels/tires. In an example, the vehicle 100 may include two, three, four, or five or more wheels/tires, and thus, the vehicle 100 may be implemented as a two-wheeled vehicle, a three-wheeled vehicle, or four-wheeled vehicle. The wheel/tire may include at least one wheel fixedly attached to the transmission, and at least one tire which is combined with a rim of the wheel and may come into contact with a driving surface.

The traveling device may include a brake, a steering, and a throttle.

The steering may be a combination of mechanisms configured to adjust a direction of the self-driving vehicle.

The throttle may be a combination of mechanisms configured to control a speed of the vehicle 100 by controlling an operation speed of the engine/motor. In addition, the throttle may adjust an amount of mixed gas in fuel air entering the engine/motor by adjusting an opening rate of the throttle, and may control the power and propulsion by adjusting the opening rate of the throttle.

The brake may be a combination of mechanisms configured to decelerating the vehicle 100. For example, the brake may use friction in order to reduce a speed of the wheel/tire.

The sensing device may be implemented as a plurality of sensors detecting information regarding surrounding environment during the traveling of the vehicle 100. In an example, the sensing device may include a global positioning system (GPS), an inertial measurement unit (IMU) a RADAR unit, a LIDAR unit, and an image sensor. In addition, the sensing device may include at least one of a temperature/humidity sensor, an infrared sensor, an air pressure sensor, a proximity sensor, and an RGB sensor (illuminance sensor), but is not limited thereto, and may include various types of sensors detecting the information regarding the surrounding environment of the vehicle 100 and providing the information to a driver and the processor 130.

In addition, the sensing device may include a movement sensing device capable of sensing a movement of the vehicle 100. The movement sensing device may include a magnetic sensor, an acceleration sensor, and a gyroscope sensor.

The GPS is a component detecting a geographic location of the vehicle 100 and the processor 130 may also acquire location information detected through the GPS, when acquiring the image 10 of the surrounding environment and the reference image 20.

The IMU may be a combination of sensors configured to detect a change of the location and direction of the vehicle 100 based on inertial acceleration. For example, the combination of sensors may include accelerators and gyroscopes.

The RADAR unit may be a sensor configured to detect objects in the environment in which the vehicle 100 is located, by using a wireless signal. In addition, the RADAR unit may be configured to detect speeds and/or directions of the objects.

The LIDAR unit may be a sensor configured to detect objects in the environment in which the vehicle 100 is located, by using a laser.

The peripheral device may include a navigation system, headlights, winkers, wipers, interior lights, a heater, an air conditioner, and the like.

The navigation system may be a system configured to determine the driving route of the vehicle 100. The navigation system may be configured to update the driving route dynamically while the vehicle 100 is traveling. For example, the navigation system may use data from the GPS and maps in order to determine the driving route of the vehicle 100.

In particular, the vehicle according to an embodiment of the disclosure may provide the merged image through the navigation system. In an example, if the vehicle 100 is in a manual driving mode, the vehicle 100 may display the merged image on a display included in the navigation system. In this case, a driver receives an image having ensured high visibility of the traffic sign information through the navigation system, thereby increasing convenience during the driving of the vehicle.

The communicator may execute communication with an external device. In an example, the communicator may execute communication with an external server with a wired/wireless communication system, and a communication system such as BlueTooth (BT), Wireless Fidelity (WI-FI), Zigbee, Infrared (IR), Serial Interface, Universal Serial Bus (USB), NFC (Near Field Communication), V2X (Vehicle to Everything), mobile communication (Cellular) may be used.

The communicator may acquire the traffic sign information corresponding to the current location of the vehicle 100 from an external server and the processor 130 may generate an image by adding the traffic sign information received through the communicator to the merged image.

The communicator according to an embodiment of the disclosure may receive various pieces of information relating to current location, route, and the like that the vehicle 100 is traveling, from an external server. In an example, the communicator may receive weather information, news information, road condition information, and the like from an external server. The road condition information may mean condition information regarding a route (or road) through which the vehicle 100 is traveling. For example, the communicator may receive various pieces of information such as road surface condition information, traffic condition information, traffic accident information, traffic enforcement information, and the like. The processor 130 may provide the received road condition information to a driver with the merged image. According to an embodiment, the processor 130 may execute the self-driving of the vehicle 100 based on the merged image and the received road condition information in the self-driving mode.

The display may include at least one of a liquid crystal display, a thin film transistor-liquid crystal display, an organic light-emitting diode, a flexible display, a see-through display, a 3D display, and a head up display (UHD).

In an example, the display may be implemented as a display included in the navigation system prepared in the vehicle 100 or may be implemented as a HUD displaying vehicle driving information in a region of a windshield. The vehicle 100 may include a plurality of displays depending on the implementation forms. Hereinafter, for convenience of the description, the display is assumed to be implemented as the HUD and this will be described in more detail with reference to FIG. 5.

The processor 130 according to an embodiment of the disclosure may provide the merged image through the display. However, there is no limitation thereto, and the processor 130 may display only the identified traffic sign information from the reference image 20 corresponding to the current location. In an example, the processor 130 may merge the identified traffic sign information with the image 10 of the surrounding environment and display the merged image, or may display only the identified traffic sign information at a corresponding position on the windshield of the vehicle in an augmented reality (AR mode).

The processor 130 according to an embodiment of the disclosure may acquire images of portions right and left of, and behind the vehicle 100, in addition to a portion ahead of the vehicle 100 through the camera 110. In addition, the processor 130 may generate the image 10 of the surrounding environment based on the image acquired through the camera 110 and the dynamic object acquired through various types of sensors prepared in the vehicle. According to an embodiment, the image 10 of the surrounding environment may not only a 2D image obtained by capturing only a portion ahead of the vehicle 100, but also a 3D image obtained by capturing a surrounding environment of the vehicle 100 with a 360-degree field of view based on the images of portions right and left of, and behind the vehicle. However, there is no limitation thereto, and the processor 130 may provide the merged image by rendering a dynamic object (for example, neighboring vehicles, pedestrians, and the like) detected through various types of sensors prepared in the vehicle 100 in a 3D format on the image 10 of the surrounding environment.

Figure 3A:
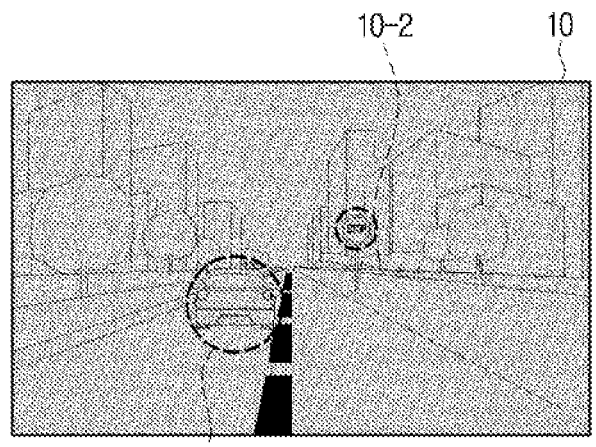
FIGS. 3A and 3B are views for describing a method for acquiring a merged image according to an embodiment.
Figure 3A:
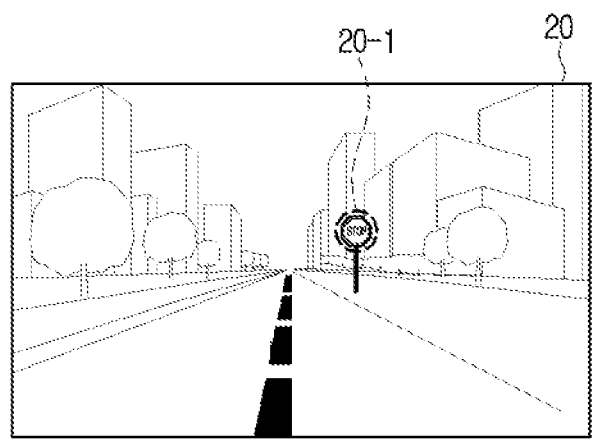
Figure 3A:
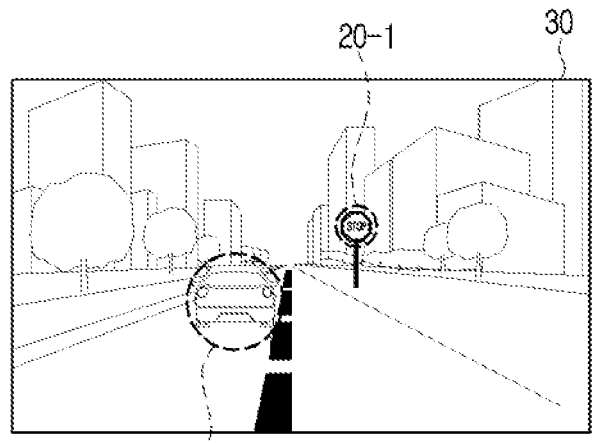
Figure 3B:
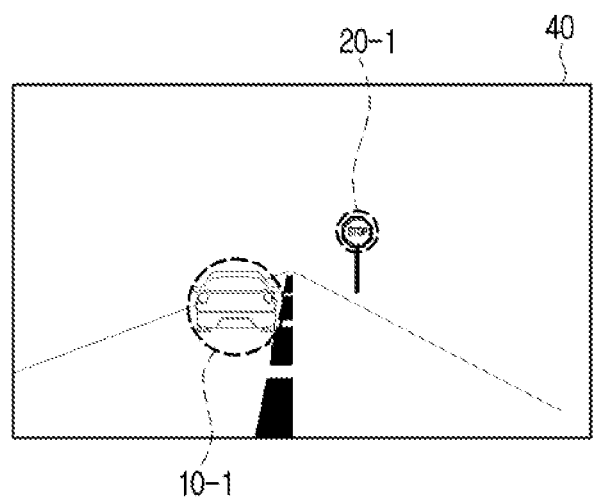

FIGS. 3A and 3B are views for describing a method for acquiring a merged image according to an embodiment of the disclosure.

Referring to FIG. 3A, as shown in (a) of FIG. 3A, the visibility may be low due to the weather factor and the time factor during the traveling of the vehicle 100. When the visibility is low, it may be difficult to identify the road sign 10-2 and a traveling vehicle 10-1 located in portions ahead of the vehicle 100, and this may increase the risk of an accident.

In addition, during the self-driving of the vehicle 100, the visibility of the image 10 of the surrounding environment acquired through the camera 110 is inversely proportional to a failure rate of the self-driving. In an example, if the visibility of the image 10 of the surrounding environment is high, the self-driving vehicle determining the traveling route based on the image 10 of the surrounding environment may execute the self-driving at a low failure rate. In contrast, if the visibility of the image 10 of the surrounding environment is low, the self-driving vehicle may execute the self-driving at a high failure rate.

Therefore, it is possible to reduce the risk of an accident and the failure rate, when the reference image 20 corresponding to the location of the vehicle 100 is acquired, the traffic sign information included in the reference image 20 is identified and merged with the image 10 of the surrounding environment, and the driving of the vehicle 100 is controlled based on the merged image.

As shown in (b) of FIG. 3A, the reference image corresponding to the current location of the vehicle 100 may be an image in which the traffic sign information such as the road sign 20-1 is identifiable. The traffic sign information may mean not information changing in real time, but fixed information such as the road sign 20-1, a lane, a crosswalk, a speed bump, and road markings with words. The information changing in real time is information such as the traveling vehicle 10-1 included in the image 10 of the surrounding environment and information regarding the traveling vehicle 10-1 needs to be identified from the image 10 of the surrounding environment acquired through the camera 110 at the current time, not from the reference image 20.

The vehicle 100 according to an embodiment of the disclosure may acquire real-time information (for example, the traveling vehicle 10-1) from the image 10 of the traveling environment shown in (a) of FIG. 3A and acquire the traffic sign information from the reference image 20 shown in (b). The vehicle may acquire a merged image 30 in which the acquired image 10 of the traveling environment and the traffic sign information are merged. In an example, the vehicle may generate a merged image by replacing the corresponding region on the image 10 of the surrounding environment based on the identified traffic sign information, with the identified traffic sign information. The merged image may be expressed as shown in (c) of FIG. 3A. The merged image may include the traveling vehicle 10-1 and the road sign 20-1.

The vehicle 100 according to an embodiment of the disclosure may acquire a rendered image 40 by executing rendering of the merged image 30 as shown in FIG. 3B. In an example, the vehicle 100 may determine a traveling route in a self-driving mode based on the merged image 30. In another example, the vehicle 100 may acquire the rendered image 40 obtained by removing factors other than important factors for determining the traveling route from the merged image 30. The important factors herein may be the traveling vehicle 10-1, the traffic sign information such as lanes or the road sign 20-1, and the dynamic object (for example, a pedestrian, a motorcycle, or a bicycle) which affects the determination of the traveling route.

The rendered image 40 according to an embodiment of the disclosure is advantageous in terms of a smaller size than that of the merged image 30 and reducing the failure rate to be lower than that of the merged image when determining the traveling route of the vehicle 100 in the self-driving mode.

Figure 4:
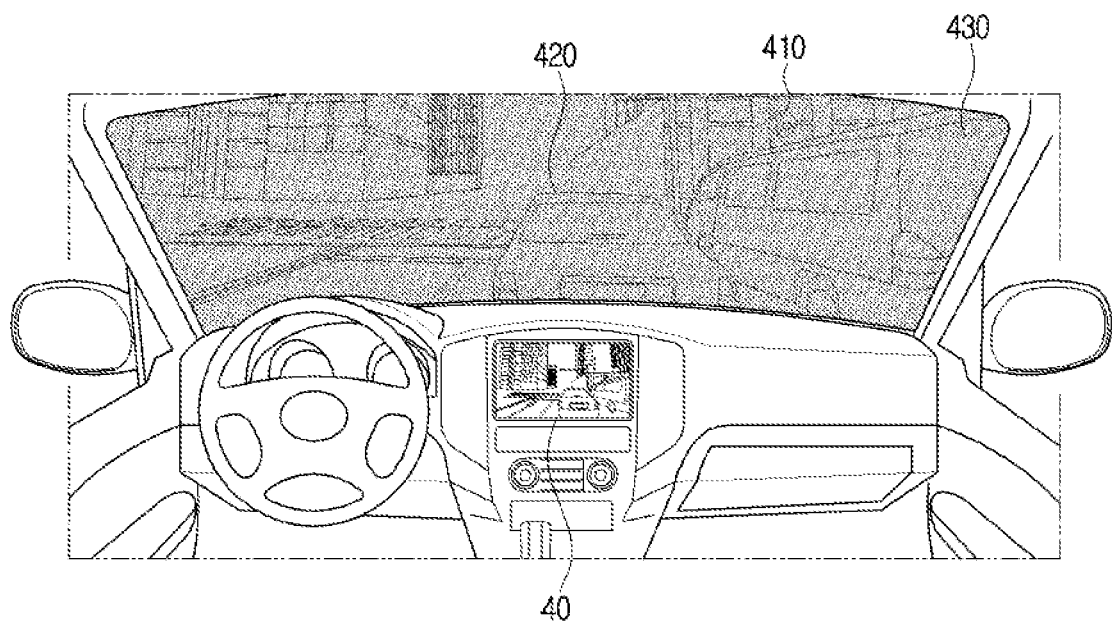
FIGS. 4 and 5 are views for describing a method for displaying the merged image according to an embodiment.
Figure 5:
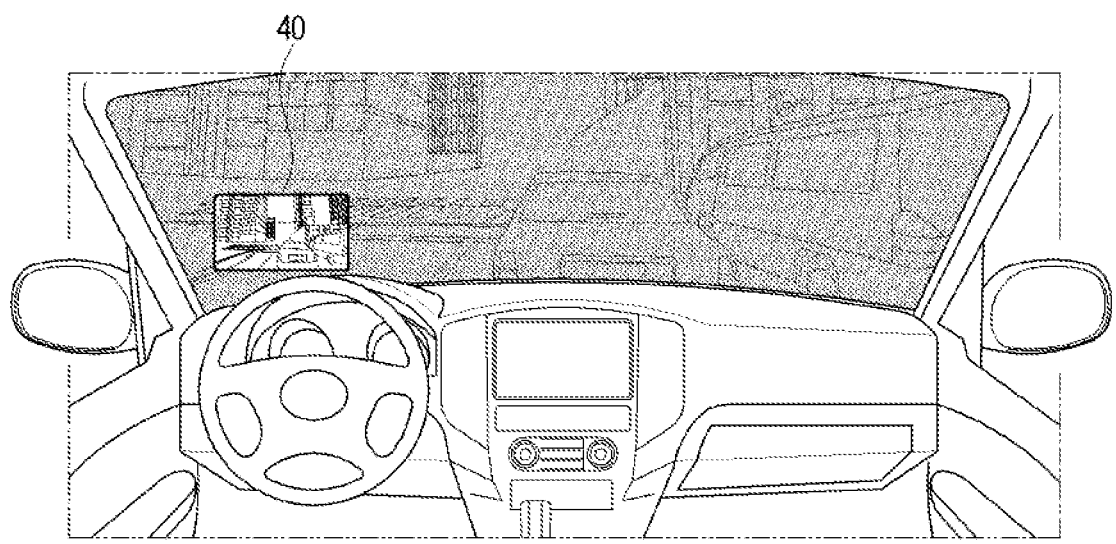

FIGS. 4 and 5 are views for describing a method for displaying the merged image according to an embodiment of the disclosure.

Referring to FIG. 4, the vehicle 100 according to an embodiment of the disclosure may provide the merged image 30 to a driver, in addition to the use of the merged image 30 or the rendered image 40 in order to determine the self-driving route in the self-driving mode.

In an example, the vehicle 100 may display the merged image 30 on a display prepared on a dashboard or a navigation system of the vehicle 100. A driver may drive the vehicle with the displayed merged image 30, although a road sign 410 and traveling vehicles 420 and 430 are limitedly identified through the windshield due to the weather factor or the time factor. The merged image 30 may be provided only in a manual driving mode of the vehicle 100, but is not limited thereto, and the vehicle 100 may execute the self-driving based on the merged image 30 or the rendered image 40 in the self-driving mode, and display the merged image 30 or the rendered image 40 at the same time.

Referring to FIG. 5, the merged image 30 or the rendered image 40 may be provided to a driver through the HUD display. However, there is no limitation thereto, and the vehicle 100 may display the identified traffic sign information using the AR mode. In an example, the vehicle 100 may display the road sign 410 acquired from the reference image 20 at a position corresponding to the road sign 410 on the windshield. In this case, a driver may receive the traffic sign information through the windshield without any limitation due to the weather factor or the time factor.

Figure 6:
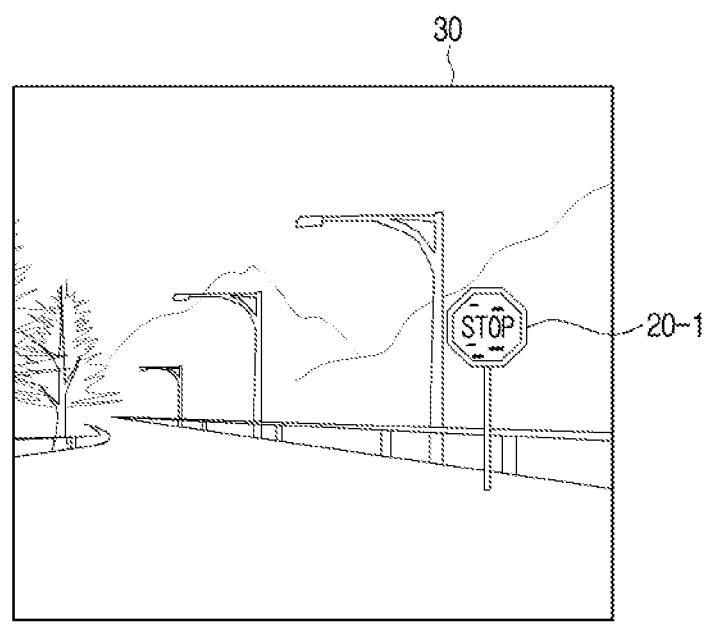
FIG. 6 is a view for describing a method for acquiring a merged image according to another embodiment.
Figure 6:
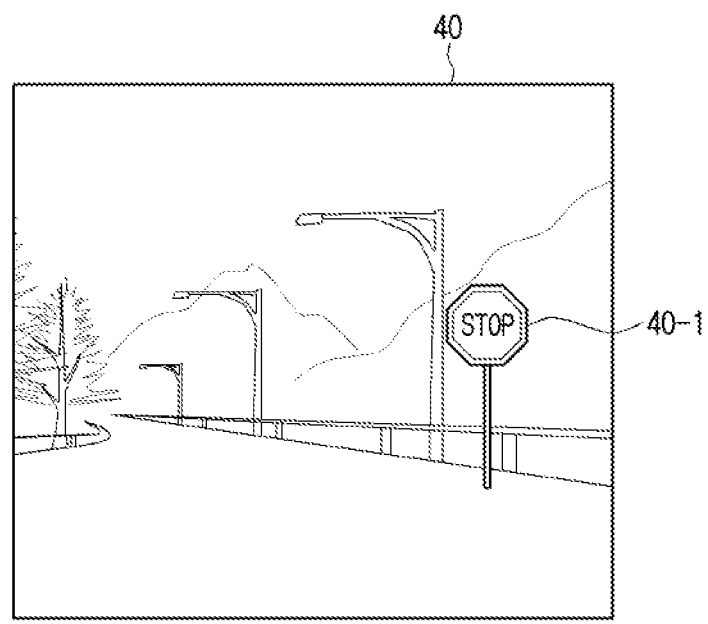

FIG. 6 is a view for describing a method for acquiring a merged image according to another embodiment of the disclosure.

The vehicle 100 according to an embodiment of the disclosure may store a representative image corresponding to each traffic sign information. In an example, a representative image corresponding to a "Stop" road sign may be stored in the vehicle 100 in advance. In this case, the vehicle 100 may replace the "Stop" road sign with the representative image in the merged image 30.

The traffic sign information included in the merged image 30 is acquired from the reference image 20, and if unnecessary information (for example, graffiti) is included around the traffic sign information on the reference image 20, the traffic sign information included in the merged image 30 may include the unnecessary information as it is. In order to acquire an image having higher visibility, the vehicle 100 may identify the traffic sign information in the merged image 30 and perform rendering to replace the identified traffic sign information with each corresponding representative image.

For example, referring to FIG. 6, the "Stop" road sign 30-1 included in the merged image 30 includes unnecessary information, but a "Stop" road sign 40-1 included in the rendered image 40 may be replaced with the representative image.

Figure 7:
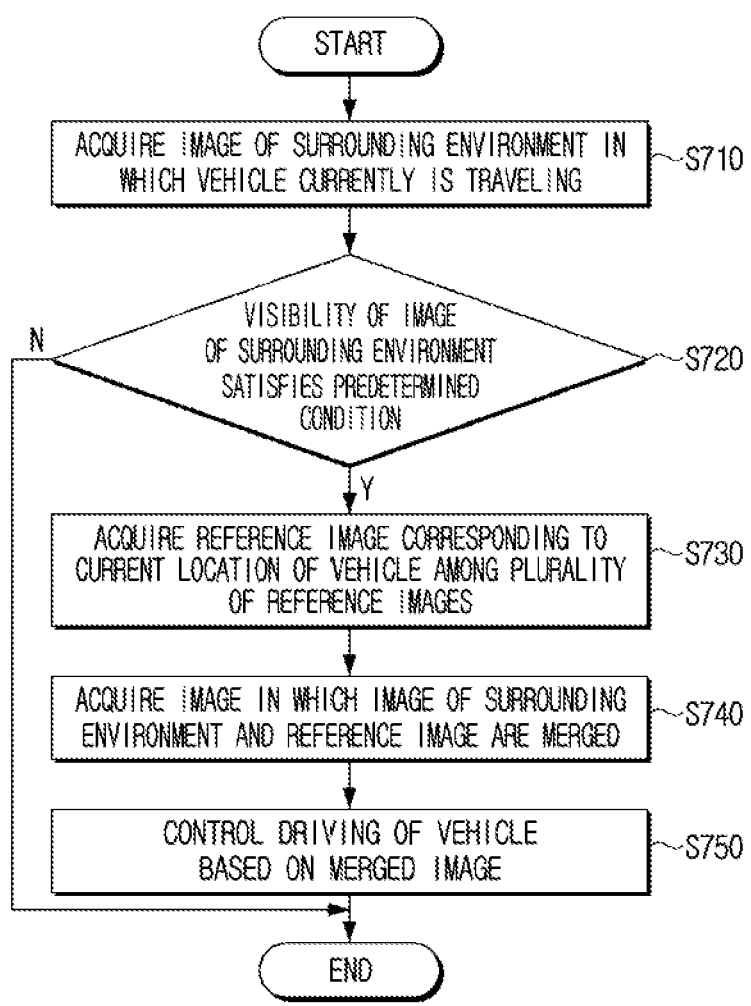
FIG. 7 is a flowchart for describing a method for controlling a vehicle according to an embodiment.

FIG. 7 is a flowchart for describing a method for controlling a vehicle according to an embodiment of the disclosure.

First, an image of a surrounding environment in which a vehicle is currently traveling is acquired (S710).

If visibility of the image of the surrounding environment satisfies a predetermined condition (S720: Y), a reference image corresponding to a current location of the vehicle is acquired among a plurality of reference images (S730).

An image in which the image of the surrounding environment and the reference image are merged is acquired (S740).

The driving of the vehicle is controlled based on the merged image (S750).

Herein, Step S740 of acquiring the merged image may include identifying traffic sign information included in the reference image, and generating a merged image by replacing a corresponding region in the image of the surrounding environment with the identified traffic sign information.

The traffic sign information may include at least one of a road sign, a lane, a speed bump, traffic lights, and road markings with words.

The vehicle may store a representative image indicating the traffic sign information, and in Step S740 of acquiring the merged image, a representative image corresponding to at least one piece of the traffic sign information included in the merged image may be acquired, and the at least one piece of the traffic sign information may be replaced with the acquired representative image.

The control method according to an embodiment of the disclosure may further include acquiring traffic sign information corresponding to a current location from an external server, and adding the traffic sign information acquired from the external server to the merged image.

In addition, the vehicle may include a head up display (HUD) and the control method may further include providing at least one of the merged image and the identified traffic sign information through the HUD.

The control method according to an embodiment of the disclosure may further include, based on visibility of the image of the surrounding environment being higher than visibility of the reference image corresponding to current position information, updating the reference image with the image of the surrounding environment.

The control method according to an embodiment of the disclosure may further include comparing visibility of the image of the surrounding environment and visibility of the reference image, after a predetermined period of time elapsed from a point when the reference image is generated, and based on visibility of the image of the surrounding environment being higher than visibility of the reference image, updating the reference image with the image of the surrounding environment.

In addition, Step S750 of controlling driving of the vehicle may include, based on the vehicle being in a self-driving mode, executing self-driving based on the merged image, and based on the vehicle being in a manual driving mode, providing at least one of the merged image and the identified traffic sign information through the HUD.

At least some configurations of the methods according to embodiments of the disclosure described above may be implemented in a form of an application installable in the existing electronic device.

In addition, at least some configurations of the methods according to embodiments of the disclosure described above may be implemented simply by the software update or hardware update in the existing electronic device.

Further, at least some configurations in embodiments of the disclosure described above may be executed through an embedded server prepared in the electronic device or an external server of the electronic device.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as software modules. Each of the software modules may execute one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. A vehicle comprising:
   a camera;
   a storage storing a plurality of reference images and location information corresponding to each of the plurality of reference images; and
   a processor configured to acquire an image of a surrounding environment in which the vehicle is currently traveling through a camera,
   based on visibility of the image of the surrounding environment satisfying a predetermined condition, acquire a reference image corresponding to a current location of the vehicle among the plurality of reference images,
   acquire an image in which the image of the surrounding environment and the reference image are merged, and
   control driving of the vehicle based on the merged image.

2. The vehicle according to claim 1, wherein the processor is configured to identify traffic sign information included in the reference image, and generate a merged image by replacing a corresponding region in the image of the surrounding environment with the identified traffic sign information.

3. The vehicle according to claim 2, wherein the traffic sign information comprises at least one of a road sign, a lane, a speed bump, traffic lights, and road markings with words.

4. The vehicle according to claim 2, wherein the storage stores a representative image indicating the traffic sign information, and
   wherein the processor is configured to acquire a representative image corresponding to at least one piece of traffic sign information included in the merged image, and replace the at least one piece of traffic sign information with the acquired representative image.

5. The vehicle according to claim 2, further comprising:
   a communicator,
   wherein the processor is configured to
   acquire traffic sign information corresponding to the current location from an external server through the communicator, and
   add the traffic sign information acquired from the external server to the merged image.

6. The vehicle according to claim 2, further comprising:
   a head up display (HUD),
   wherein the processor is configured to provide at least one of the merged image and the identified traffic sign information through the HUD.

7. The vehicle according to claim 2, further comprising:
   a head up display (HUD),
   wherein the processor is configured to acquire a rendered image by performing rendering of the merged image, store the rendered image in the storage, and provide the rendered image through the HUD,
   wherein the rendered image is an image generated by identifying a dynamic object and the traffic sign information in the merged image.

8. The vehicle according to claim 1, wherein the processor is configured to, based on visibility of the image of the surrounding environment being higher than visibility of the reference image corresponding to current location information, update the reference image with the image of the surrounding environment.

9. The vehicle according to claim 1, wherein the processor is configured to compare visibility of the image of the surrounding environment and visibility of the reference image, after a predetermined period of time elapsed from a point based on the reference image being generated, and
   based on visibility of the image of the surrounding environment being higher than visibility of the reference image, updating the reference image with the image of the surrounding environment.

10. The vehicle according to claim 1, further comprising:
    a head up display (HUD),
    wherein the processor is configured to, based on the vehicle being in a self-driving mode, executing self-driving based on the merged image, and based on the vehicle being in a manual driving mode, providing at least one of the merged image and the identified traffic sign information through the HUD.

11. A method for controlling a vehicle in which a plurality of reference images and location information corresponding to each of the plurality of reference images are stored, the method comprising:
    acquiring an image of a surrounding environment in which the vehicle is currently traveling;
    based on visibility of the image of the surrounding environment satisfying a predetermined condition, acquiring a reference image corresponding to a current location of the vehicle among the plurality of reference images;
    acquiring an image in which the image of the surrounding environment and the reference image are merged; and
    controlling driving of the vehicle based on the merged image.

12. The method according to claim 11, wherein the acquiring a merged image comprises:
    identifying traffic sign information included in the reference image; and
    generating a merged image by replacing a corresponding region in the image of the surrounding environment with the identified traffic sign information.

13. The method according to claim 12, wherein the traffic sign information comprises at least one of a road sign, a lane, a speed bump, traffic lights, and road markings with words.

14. The method according to claim 12, wherein the vehicle stores a representative image indicating the traffic sign information, and
    wherein the acquiring a merged image comprises acquiring a representative image corresponding to at least one piece of traffic sign information included in the merged image, and replacing the at least one piece of traffic sign information with the acquired representative image.

15. The method according to claim 12, further comprising:
    acquiring traffic sign information corresponding to the current location from an external server; and adding the traffic sign information acquired from the external server to the merged image.

\* \* \* \* \*